Patented May 29, 1928.

1,671,203

UNITED STATES PATENT OFFICE.

HANS NUHN, OF KARLSRUHE, GERMANY, AND LEWIS H. BLOOD, OF MATAWAN, NEW JERSEY, ASSIGNORS TO ANTIMONY PRODUCTS CORPORATION, OF NEW YORK, N. Y., A CORPORATION OF DELAWARE.

METHOD OF PREPARING ANTIMONY SULPHIDE.

No Drawing.   Application filed July 27, 1922.   Serial No. 578,003.

Our invention relates to a method of preparing antimony sulphide by the direct reaction of sodium sulphide, stibnite and sulphur, produced in an economical and highly efficient manner, whereby the difficulties inherent in the methods pursued heretofore are obviated, the expensive and cumbersome apparatus heretofore used is dispensed with and the product is manufactured in a convenient and inexpensive manner.

We are also enabled to produce at the same time by-products which are capable of equivocal use in producing other desirable compounds and avoid the production of by-products of little or no value as is the case in the methods heretofore employed.

Prior to our invention, antimony sulphide has been produced commercially, generally by one of the following methods:

1. By digesting stibnite in water, lime and sulphur yielding calcium thio-antimonate which is filtered off and precipitated with sulphuric acid yielding antimony penta-sulphide and calcium sulphate.

2. By digesting lime, sulphur, sodium carbonate and stibnite to form a mixture of sodium and calcium thio-antimonate, which is treated in the manner described in process No. 1, giving calcium sulphate and sodium sulphate and antimony pentasulphide.

3. By fusing sodium carbonate, stibnite and sulphur, leaching with water, filtering and precipitating with sulphuric acid yielding antimony pentasulphide.

All of these processes involve the provision of bulky apparatus which is difficult of manipulation. All of them involve the production of a large quantity of hydrogen sulphide and in none of them are the by-products of any substantial value. All of these prior processes require considerable time and the yield is frequently a product which is more or less impure, being adulterated with calcium sulphate.

In our improved process, the apparatus required is simple and easily handled, the process is a rapid one, involves the formation of no objectionable gases and yields a product substantially the only impurity in which is a small quantity of sulphur, which is unobjectionable in view of the fact that the antimony pentasulphide is used in the vulcanization of rubber in which sulphur must also be used.

Our improved process also provides as a by-product sodium thio-sulphate, which may advantageously be used in the formation of antimony oxy-sulphide, or antimony crimson.

The following is an example of the manner in which our improved process may be practised, it being understood that the following description is given merely by way of example of a method that we have found to produce good results and that we do not intend to limit ourselves to the particular proportions or ingredients specified.

We take one hundred and eighty-six pounds (186 lbs.) of anhydrous sodium sulphide, two hundred and eighty pounds (280 lbs.) of pure stibnite ore (200-mesh) and thirty-two pounds (32 lbs.) of sulphur. To these we add approximately fifty gallons (50) of water and digest at boiling temperature for a period of approximately two hours. We then add sufficient water to bring the solution to 19° Baumé and atomize the solution thus formed into a closed chamber. Said chamber is provided with one or more atomizing nozzles through which the solution is driven in any suitable manner, such as by means of steam or compressed air, or by suitable pressure without the admixture of any other fluid. The chamber is also provided with an inlet for sulphur dioxide gas, a slight excess of which is introduced through said inlet and with an outlet for any excess of sulphur dioxide not used in the reaction and for such air or other agent as may be used in introducing the liquid into the chamber. An outlet is provided at the bottom of the chamber through which the product of reaction may be drawn off. We have not illustrated said chamber because it may take a variety of forms, it being only necessary to provide a suitable container in which the reaction may take place as described, made of any suitable material, such as brick.

The purpose of introducing the liquid into the chamber in the finely atomized state is to produce as intimate as possible a mixture of the liquid and the sulphur dioxide. This mixture may be produced in any other suitable manner, as for instance bubbling the sulphur dioxide gas up through the solution, although this method of procedure requires considerably more time than that described above and requires the provision of a tank for handling larger quantities of solution for a relatively longer period.

The mixture of the liquid and the sulphur dioxide reacts to form antimony pentasulphide, free sulphur and sodium thiosulphate, the sodium thio-sulphate remaining in solution and the antimony pentasulphide being in suspension in the solution. The liquid carrying the antimony pentasulphide in suspension is drawn off and the solid constituents are separated from the liquid by filtration, or otherwise. The filtrate is then pumped into a separate tank or evaporated to dryness, as desired, depending upon the use to which the sodium thio-sulphate is to be put. The antimony pentasulphide mixed with the sulphur is dried, if desired, pulverized in a suitable mill and is then ready for use in the rubber industry.

The reactions are probably the following:

I. 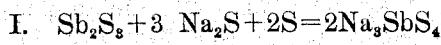 $Sb_2S_3 + 3Na_2S + 2S = 2Na_3SbS_4$ the foregoing being the reaction which occurs during digestion and before atomization as described above.

II. 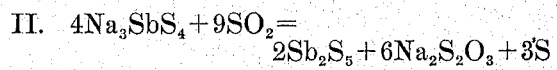 $4Na_3SbS_4 + 9SO_2 = 2Sb_2S_5 + 6Na_2S_2O_3 + 3S$ this being the reaction which occurs in the atomizing chamber.

The by-product sodium thio-sulphate is used in the production of antimony crimson from antimony trichloride as follows:

III. 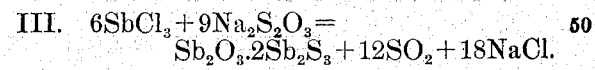 $6SbCl_3 + 9Na_2S_2O_3 = Sb_2O_3.2Sb_2S_3 + 12SO_2 + 18NaCl.$

It will be observed that in the last reaction a considerable quantity of sulphur dioxide gas is formed, which may be used in reaction II above. Great economies therefore result from the manufacture of antimony pentasulphide and antimony crimson in the same factory, since the sodium thiosulphate produced as a by-product in reaction II may be used in reaction III and the sulphur dioxide produced as a by-product in reaction III may be used in reaction II.

What we claim is:

The step in the method of making antimony pentasulphide which comprises atomizing by steam a solution of thio-antimoniate and of an acid gas.

In testimony whereof, we have signed our names to this specification the 26th day of June, 1922, and the 18th day of May, 1922, respectively.

HANS NUHN.
LEWIS H. BLOOD.